May 19, 1953   P. B. LEVITT ET AL   2,638,786
RATE OF RISE-DIVE INDICATOR
Filed May 23, 1947   3 Sheets-Sheet 3
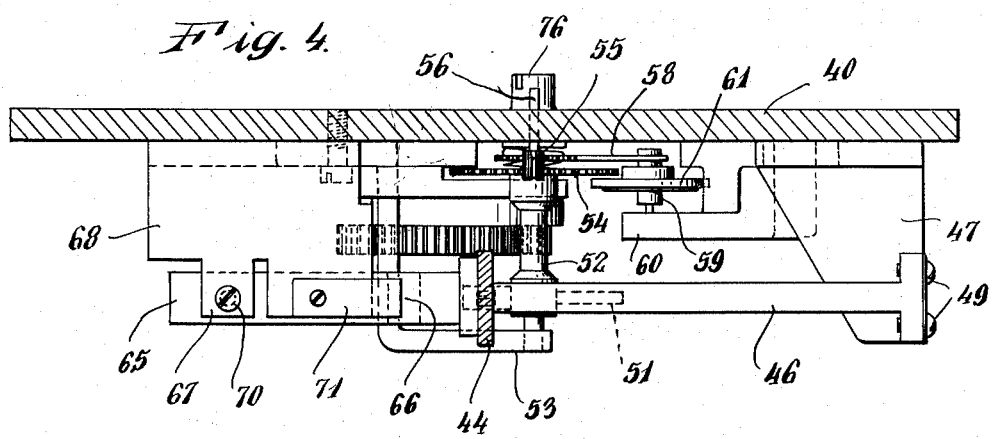
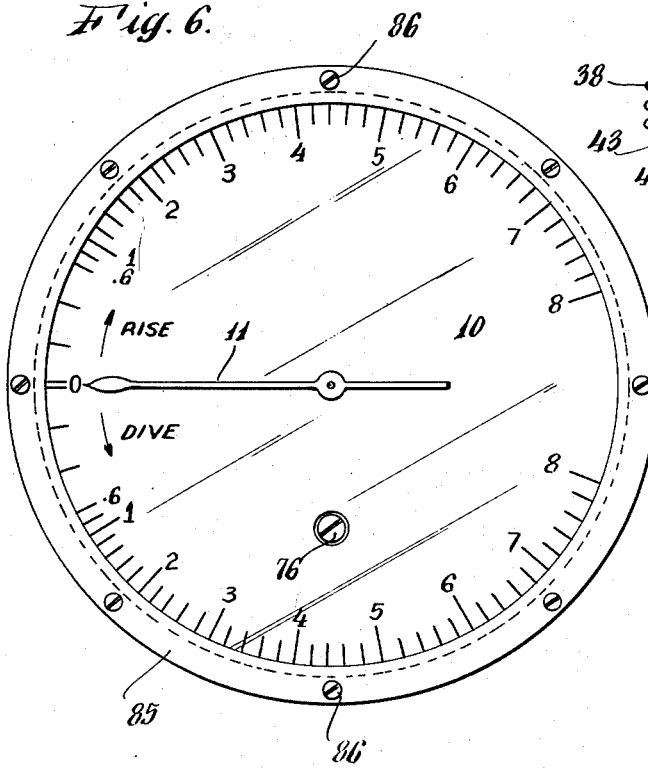
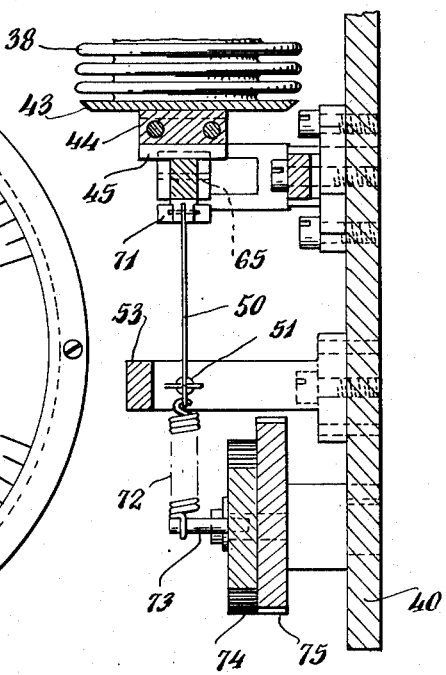
INVENTOR.
John D. Morgan
Percy B. Levitt
BY
ATTORNEY.

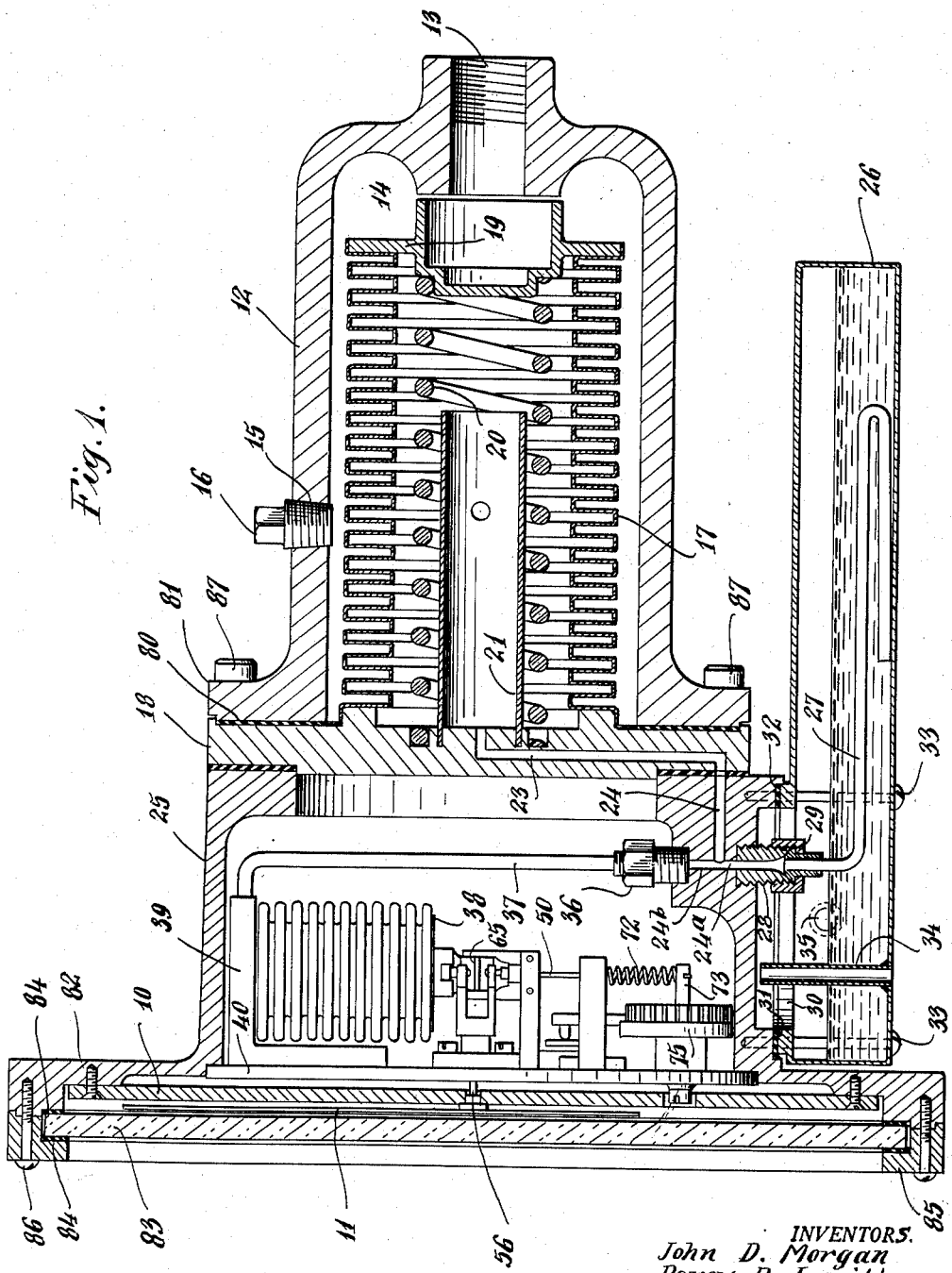

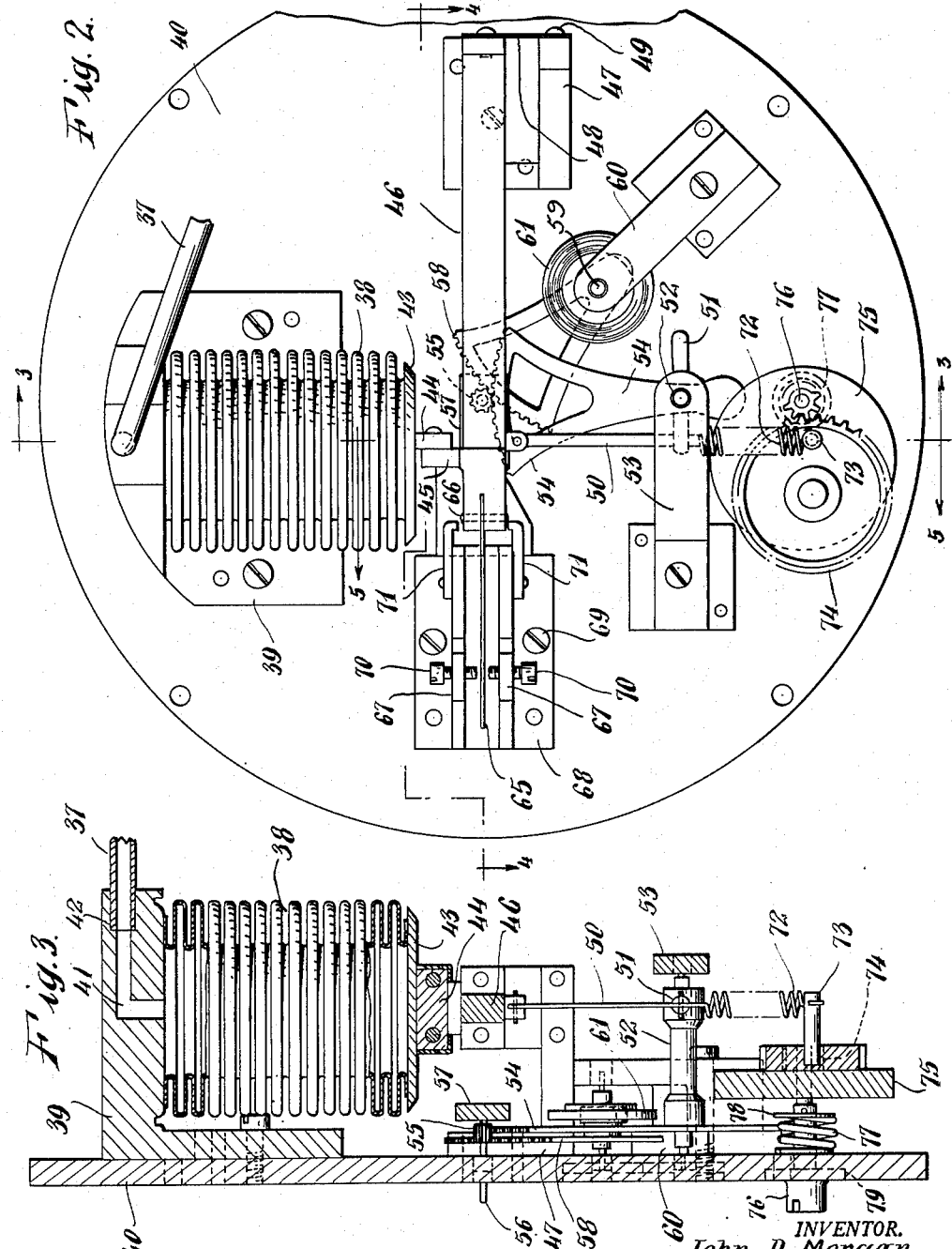

Patented May 19, 1953

2,638,786

UNITED STATES PATENT OFFICE 2,638,786

RATE OF RISE-DIVE INDICATOR

Percy B. Levitt, Millburn, and John D. Morgan, South Orange, N. J., assignors, by mesne assignments, to Cities Service Research and Development Company, New York, N. Y., a corporation of New Jersey Application May 23, 1947, Serial No. 750,100

2 Claims. (Cl. 73—397)

This invention relates to navigational instruments, and more particularly to an improved device for indicating the rate at which a submarine vessel is diving from or rising towards the surface of the sea.

The conventional depth gauges with which every submarine is equipped serve to indicate the depth at which the vessel lies at any given time. Obviously as the vessel changes position there is a corresponding change in the depth gauge reading, a fact which is taken advantage of by experienced crewmen to gain some very rough approximation of the rate at which that change is taking place. In the absence of any better guide, this very rough correlation of time and changing elevation has had to suffice, but that it has been a far from satisfactory criterion is detailed in the histories of submarines which have been lost by reason of the inability of the crew to prevent the vessel from breaking surface at just the wrong time, or to hover far below surface during enemy action.

In our Patent 2,412,740, we have described an instrument for indicating the rate at which a submarine is diving from, or rising towards the water's surface, data which gives an accurate basis for the application by submarine crewmen of that degree of elevational control which is necessary to hold the vessel at a given level, or to rise or dive at a speed which may be kept within safe limits. This device has proven sufficiently sensitive and accurate to make it a highly valuable adjunct to conventional depth gauges in submarine navigation work. Service experience has demonstrated, however, that the instrument is inclined to be somewhat sluggish in the immediate vicinity of its zero position, so that departures from a given level of operation at very low rates are not always precisely and immediately noted. The lack of a ready means for adjusting the zero position of the instrument has also given rise to operational troubles; and the use of an overly delicate pointer operating mechanism has made for trouble both in the manufacture of the instrument and, at times, in its usage.

The principal object of the present invention is to provide a rate of rise-dive indicator which is extremely sensitive in indicating very small rates of change of vertical position of a submarine vessel, and which returns very promptly and accurately to its zero position when that vessel is riding at a constant depth.

It is a further object to provide an instrument of the foregoing kind which operates over an expanded scale in the immediate vicinity of its zero position so that very small rates of change are indicated with great precision and accuracy; and wherein the higher, and consequently less critical rates of change are indicated upon a contracted scale, so that the overall range of the instrument may be as great as is desired without requiring a scale of excessive length. This means that we can employ a circular scale which for the sake of clarity is marked off in one direction from the zero point to indicate rates of dive, and in the other direction from zero to indicate rates of rise, and that each part of the scale can be confined to less than 180°, so that there need be no overlapping with its likelihood of confusion in reading.

Further objects of the invention are to provide a rate of dive-rise measuring device having an actuating mechanism which may be manufactured easily and at comparatively low cost; one in which provision is made for simple and ready adjustment of the zero position of its indicator mechanism whereby to correct for any permanent deformation which the operating parts may have taken in normal usage; and generally to provide a device of this kind which is of more rugged construction and of greater precision in its operation and which lends itself more readily to duplication by conventional manufacturing operations than the device of our earlier patent.

The full nature of our invention and of the manner in which the foregoing and other of its objects may be attained, will be more fully understood from a consideration of the following description of one practical embodiment of it, as shown in the accompanying drawings, in which:

Fig. 1 is an elevational view, partly in plan, and partly in section, of a preferred form of indicating instrument in which various details of both its rate measuring and indicating mechanisms are clearly shown;

Fig. 2 is an elevational view, on an enlarged scale, of the indicator mechanism of the instrument of Fig. 1;

Fig. 3 is a sectional view taken on the line 3—3 of Fig. 2;

Fig. 4 is a sectional view taken on the line 4—4 of Fig. 2;

Fig. 5 is a sectional view taken on the line 5—5 of Fig. 2;

Fig. 6 is an end elevational view of the instrument of Figs. 1 to 5 inclusive, but on a somewhat reduced scale, showing the indicating pointer of the unit and the calibrated scale over which it sweeps to indicate rates of rise and dive.

The instrument shown in Figs. 1 to 6 is of the unitary type, having its rate measuring and indicating mechanisms joined together in one compact assembly which is adapted to be mounted in a submarine vessel in such positions that dial 10 and indicating pointer 11 are readily visible to the navigating officer and his crew. In the preferred form of instrument (Fig. 1), casing 12 is provided with a threaded opening 13, for receiving a line (not shown) leading to the outside of the vessel so that chamber 14 will be filled with sea water at a pressure corresponding to the hydrostatic head acting upon the submarine's hull. Since this pressure may vary from a few to several hundred feet of water, depending upon the depth at which the vessel is operating at any given time, it is evident that the casing must be of suitably rugged construction. We find it convenient to cast the element of bronze, a metal which is substantially unaffected by sea water, although other corrosion-resistant metals may be employed and may be formed up in any suitable way. It is of particular note that the casing has a vent 15 through which air may be allowed to escape during the initial filling of chamber 14 with sea water. Under normal operating conditions, vent 15 is of course closed tightly by a suitable plug 16.

One wall of chamber 14 includes a spring supported diaphragm which is adapted to be displaced to a greater or lesser extent, depending upon the pressure applied to it. In the preferred embodiment, this diaphragm element takes the form of a bellows 17 which is secured in leak-tight relation to cover plate 18, and which has its outer end closed and sealed by a cap 19. The supporting spring 20, confined between cover plate 18 and cap 19, tends to hold the bellows in a distended position against the force of sea water which is acting on the outside of the latter element. It will be evident that the strength and stiffness of the spring must be gauged in terms of the overall range of the instrument, and of the maximum operating depth at which the instrument is intended to function. The illustrated instrument, for example, is designed for operation at all depths up to 200 ft., and spring 20 is of a stiffness appropriate to that operating range. In order to prevent excessive displacement of the bellows, and the destruction of its supporting spring when the vessel dives below the 200 ft. level, we provide a stop element in the form of a tube 21 mounted on cover plate 18 within spring 20 so that its free end may engage and support the cap 19 when the pressure in chamber 14 rises to excessive values. We may also provide a valve arrangement, as shown in our earlier patent, for automatically shutting off communication between chamber 14 and the open sea when pressure conditions exceed some predetermined safe value.

The inside of bellows 17 forms a part of a liquid filled system having a fixed orifice therein which serves to measure the rate of change of pressure in chamber 14. This change, of course, reflects the corresponding change in pressure on the hull of the vessel, and is therefore a measure of the rate at which the vessel is diving from or rising towards the surface of the sea. Referring again to Fig. 1, it will be noted that the system includes bellows 17, conduit 23 in cover plate 18, conduit 24 in body element 25, of which one branch, 24a, leads through a fixed orifice into sump 26 and terminates below the normal level of liquid in that element. The orifice preferably takes the form of a tube 27 of restricted cross section and definite length which is joined to 24a by coupling 29. The use of a tube for this purpose means that the orifice may be large enough in cross sectional area to permit viscous flow, and that pressure may be built up across the orifice on a linear scale. It has the further advantage of making for manufacturing economy in that special parts do not have to be formed and assembled, and of making for ease of calibration of the finished device by reason of the fact that the total resistance of the orifice may be varied by mere adjustment of its length. It is of further note that the orifice tube terminates on the bottom of sump 26 and at substantially the geometric center of that element, an arrangement which minimizes the effect upon the system of changes in head of liquid in sump 26 resulting from the tilting of the instrument as the submarine dives or rolls.

The sump element of the illustrated unit is an oblong sheet metal box having a relatively large circular opening 30 in the forward end of its top surrounded by a flange 31 which is adapted to fit against the underside of body 25 with a sealing gasket 32 between the opposing surfaces, and to be secured in that position by screws 33 which pass through the box and are threaded into the body. Proper operation of the device requires that the liquid in sump 26 shall be subjected at all times to atmospheric pressure, a requirement which is met by the provision of a vent tube 34 extending from the bottom of sump 26 up through the opening 30 so that it terminates very close to the underside of body 25. This arrangement obviously minimizes the possibility of losing liquid through the vent opening as a result of any sloshing which may occur in sump 26. A plunged opening 35, shown in dotted lines in the far side wall of the sump as viewed in Fig. 1, serves as a means for adding liquid to the sump or for draining off excess as occasion may require.

The second branch, 24b, of the conduit in body 25 terminates in a threaded opening which is adapted to receive a coupling 36 mounted upon the end of a tube 37 leading to the expansible element 38 of the pressure indicating mechanism. It will be observed that this latter element is a bellows which has been found to be somewhat easier to make and to duplicate, and to be somewhat more satisfactory in its response to very low pressure changes in the liquid system than the small volume, low spring test Bourdon tube employed in the instrument which is illustrated and described in our earlier patent. Referring to Figs. 2 and 3, it will be observed that the bellows is secured in leak-tight relation to a bracket 39, mounted upon a circular supporting plate 40 and having a passage 41 leading from the inside of the bellows to an enlarged opening 42 within which the end of tube 37 is sweated or otherwise fixed. The free end of bellows 38 is closed and sealed by a relatively stiff element 43, the latter having a dependent tab 44 which is secured to an upstanding tab 45 on pivotally mounted bar 46. In order to avoid the high and variable friction which is associated with jewel and similar types of bearings, we preferably secure the right hand end of bar 46 (as viewed in Fig. 2) to a bracket 47 mounted on plate 40, by a thin and highly flexible strip of spring metal 48, the ends of the strip being secured to the end of bar 46 and to bracket 47 by screws 49 or in any other convenient way. In the illustrated device, pivot link 48 is a strip of beryllium copper measuring about 1" x ¼" x .007", which has proven to be rugged enough for the purpose and to offer so little friction to the limited movement involved as to be substantially negligible. It is of further note that whatever resistance to movement pivot strip 48 may offer is of uniform character, unlike that of jewel or other types of bearings.

Any movement imparted to bar 46 by the expansion and contraction of bellows 38, in a manner later to be considered, is transmitted directly by link 50 to crank arm 51 on shaft 52, the latter being journaled at its opposite ends in bearings in supporting plate 40 and bracket 53. It will be observed (Figs. 2-3-4) that shaft 52 carries a multiplying sector 54 which is meshed with a pinion 55 mounted upon a pointer shaft 56, the latter being journaled in bracket 57 and in plate 40 through which it extends to receive the indicating pointer 11. The teeth of the multiplying sector, and of pinion 55, are made with great precision, but it is not always possible to form them so nicely that they will always be in perfect mesh. In order to avoid any backlash we prefer to engage pinion 55 with a second sector 58 mounted upon a shaft 59, journaled in supporting plate 40 and in bracket 60, and to provide a hair spring 61 which applies a slight torque to shaft 59 to hold the teeth of sector 54 and sector 58 in constant mesh with pinion 55.

The foregoing description of the major operating parts of our indicating instrument, and of the constructional details and arrangement of these parts in one preferred embodiment, forms a sufficient basis for the description of the operating principles of the device. Other constructional details and features will be taken up in the course of describing such operation. By way of preface, it will be assumed that the liquid system has been completely filled, that is to say, bellows 17, bellows 38, the several connecting passages, and orifice 27 have been fully evacuated and filled with a liquid of appropriate viscosity characteristics, and that sump 26 has also been filled with that liquid to the level indicated in Fig. 1. It is further assumed that the instrument has been installed in a submarine vessel, that its chamber 14 has been connected to the outside of the vessel, and has been vented of air and filled with sea water so that the pressure therein will correspond to the hydrostatic head acting on the vessel's hull.

In such circumstances, when the vessel is lying upon the surface, the pressure in chamber 14 is no more than a few feet of water, and suffices to displace bellows 17 to the left, as viewed in Fig. 1, only to a limited extent. The system is therefore in balance with the pressure in chamber 14 exactly offset by the reaction of spring 20, plus atmospheric pressure acting upon the liquid in sump 26. As soon as a dive is started, however, the pressure in chamber 14 rises in direct reflection of the increasing hydrostatic head acting upon the vessel, and accordingly in direct indication of the depth at which that vessel lies at any given instant. The forces acting on cap 19 are thus thrown out of balance, the pressure applied by the sea water to cap 19 tending to force that element to the left, as viewed in Fig. 1, against the reaction of spring 20 and of the resistance which orifice 27 offers to the displacement of liquid from bellows 17 through the system into sump 26. It follows that there can be no instantaneous equilibrium of the forces acting on the cap, and that the pressure in the liquid filled system will build up to whatever value is required to overcome the resistance of the orifice. This pressure rise is measured by the expansion of bellows 38, and the movement which it imparts through pivot bar 46, multiplying sector 54 and pinion 55 to pointer 11. If the dive is a rapid one, for example, the pressure in chamber 14 builds up at a rapid rate, and tends to displace bellows 17 to the left as rapidly as orifice 27 will allow liquid to be expelled from the system into the sump. The pressure needed to maintain flow through the orifice will necessarily be high, and the indicating pointer 11 will accordingly be swept across the face of dial 10 to indicate that the dive is taking place at a high rate. In the course of a less sharp dive, however, the pressure will build up in chamber 14 at a less rapid rate, and one which more nearly approaches that at which the liquid can flow from the system through the restricting orifice. It follows that the pressure drop across the orifice will be smaller than was true in the case first assumed, and that the deflection of pointer 11 will be correspondingly less, indicating, of course, that the dive is taking place at a lesser rate. As the vessel levels off at some selected depth, it will be apparent that the pressure in chamber 14 quickly reaches a static value corresponding to that depth. In these circumstances the flow of liquid from the bellows rapidly drops off until such time as the pressure of sea water acting upon cap 19 is just exactly balanced by the reaction of spring 20. Concurrently, of course, the pressure in the liquid filled system falls off, allowing pointer 11 to swing back towards its zero mark. At that point at which equilibrium is just reached, flow ceases, the pressure in the liquid filled system drops to zero, and the tip of pointer 11 will stand opposite the zero mark on dial 10 to indicate that there is no tendency on the part of the vessel towards further dive.

So much, then, for the operation of the instrument to indicate rates of dive. Assuming now that the vessel starts to rise from the depth at which it leveled off, it will be evident that this change must be reflected by a decrease in the hydrostatic head acting upon bellows 17 in chamber 14. The balanced condition which was discussed above will therefore be immediately destroyed, spring 20 in this case acting to distend the bellows and move cap 19 to the right as viewed in Fig. 1. Under these circumstances liquid is forced by atmospheric pressure from sump 26 into the system to maintain bellows 17 completely filled. Such flow will, however, be resisted by orifice 27, so that the pressure in the liquid system falls below that acting upon the liquid in the sump, that is to say, below atmospheric. Bellows 38 will collapse to reflect this pressure difference, and will swing pointer 11 in a clockwise direction as viewed in Fig. 6 to indicate that the vessel is rising. In this case, the pressure which is built up across orifice 27 will be in proportion to the rate at which bellows 17 is expanding in an effort to equalize the forces acting upon the opposite sides of cap 19. If the rise is a gradual one, a correspondingly smaller pressure difference will be required to maintain flow of liquid from the sump into the system, and the subatmospheric pressure within bellows 38 will be such as to produce a correspondingly smaller movement of pointer 11. Conversely, a rapid rise of the submarine, and a correspondingly rapid falling off of hydrostatic pressure in chamber 14, will result in the building up of a relatively large pressure difference across orifice 27, and pointer 11 will be deflected a correspondingly large amount.

It will be evident to those familiar with the art that orifice 27, by restricting the flow of liquid between bellows 17 and sump 26, introduces a time factor into the system; and that the pressure drop across the orifice is a measure of the rate at which pressure in chamber 14 is changing, rather than of the actual pressure in that chamber, and accordingly, of the rate of rising or diving of the vessel. Since this pressure drop is accurately measured by bellows 38, it follows that dial 10 may be graduated in terms of feet per second of rise on one side of its zero point, and of feet per second of dive on the other side of that neutral mark.

The utility of an instrument of this kind is largely dependent upon its sensitivity to small changes in pressure in its liquid filled system, and to the speed with which it responds to those changes. Thus the illustrated device is adapted to respond to a change in pressure in chamber 14 as of little as two to three inches of water, and of equal importance, to reflect that change within a very small fraction of a second. The accurate measuring of very low rates of rise or dive is obviously a matter of major importance, and particularly so when the vessel is cruising just below the surface, or when it is hovering at some fairly great depth under the control of changing ballast rather than its diving planes. We accordingly prefer to make our instrument most sensitive in its operation in the immediate vicinity of its zero mark; in fact, we prefer to employ expanded scale operation for a short distance on each side of the neutral mark. In order to accomplish this, we fix a leaf spring element 65 (Fig. 2) in the free end of bar 46, as for example by screw 66, and extend that spring outwardly between the spaced lugs 67 of a bracket 68 which is mounted on the rear side of supporting plate 40 by means of screws 69. The screws 70 which are threaded in lugs 67 in opposing relation, form stop elements for spring 65 and accordingly limit its free movement. Assuming that these parts are in the positions shown in Fig. 2, with spring 65 lying midway between the ends of stop screws 70, the other parts of the instrument lie in such relation that the top of pointer 11 stands opposite the zero mark on dial 10. Any movement of bar 46 under such conditions is opposed primarily by the spring effect of bellows 38, the reaction of pivot link 48, and of hair spring 61, being by comparison so slight as to be negligible. Pointer 11 is therefore free to swing a relatively large distance in response to the building up of a relatively small pressure in bellows 38, until such time as spring 65 engages one or the other of the stop screws 70. When that occurs, the tension of spring 65 is brought into play, to supplement the spring tension of bellows 38. Under such circumstances it follows that pressures acting on bellows 38 are opposed by a much heavier spring tension, and accordingly result in smaller movement of pointer 11 across the face of dial 10. In the illustrated instrument, stops 70 are so adjusted as to allow for exceptionally sensitive movement, and accordingly expanded scale operation within a range of from zero to .6 feet per second by the rise or dive, and a very much less sensitive and contracted scale operation within the range of from .6 to 8 feet per second.

It will be observed (Fig. 2) that lugs 67 carry a second pair of stop elements 71 which are so arranged as to overlie and underlie the free end of bar 46 to limit the movement of that element. In the illustrated device each of these stops has a toe portion extending at right angles to its main body to present a small and well defined abutment to bar 46. Other forms of stops, and alternate arrangements for their mounting in the instrument, will readily suggest themselves to those skilled in the art. The important thing here is not the form and construction of the elements, but the function which they perform; namely, to limit the movement of bar 46 so that the deflection of pointer 11 will not materially exceed full scale reading in either direction. In this connection it is of particular note that the stops are applied to bar 46, rather than to some other part of the moving system, for the express purpose of relieving the linkage 50—51, multiplying sector 54, and pinion 55, and the indicating pointer 11, of the strain which would be imposed upon these parts in a rise or dive at a rate in excess of that for which the instrument is designed. Thus when a submarine crash dives, its rate of descent far exceeds the 8 feet per second maximum scale reading for which this particular instrument has been designed. Under such circumstances, movement of bar 46 is limited by the lower one of stops 71 so that no excessive stress can be transmitted to the other and more delicate parts of the indicating mechanism.

It is a further factor of major importance in an instrument of this kind that the indicating pointer shall return promptly and precisely to its zero mark, and that there shall be no sluggishness of its action when the vessel is leveling off. This is partially accomplished in the illustrated instrument by the provision of expanded scale operation in the immediate vicinity of zero as heretofore described. Adequate sensitivity in this respect is also assured by the use of indicating forces which are large by comparison with pivot friction and the other opposing forces in the indicating system. It will be observed, for example, that in this instrument we employ a bellows 38 which is very large by comparison with the Bourdon tube of the instrument disclosed in our earlier patent, so that the forces acting upon the indicating gear train are proportionately large. We further find that the addition of sector 58 and hair spring 61 to the gear train, to eliminate backlash is also very helpful in assuring a prompt and accurate zero indication. We have further improved the instrument in this regard by the provision of a zero adjusting mechanism. Thus, as is best shown in Figs. 2, 3, and 5, a light spring 72 is connected between the lower end of link 50, and a crank arm 73 mounted on gear 74, which latter is journaled upon a pillar 75, on the rear of plate 40. The tension which spring 72 applies to the system may be adjusted by rotation of shaft 76, and pinion 64 mounted on its rear end, that pinion being meshed with gear 73 as best shown in Fig. 2. If in the course of operation there is any permanent deformation of bellows 38, pivot link 48, leaf spring 65 or of any of the parts of the mechanical train between the bellows and indicating pointer shaft 56, with a corresponding shift in the position which the pointer 11 takes when the system is in balance, the entire system can be returned to the initial zero setting by an increase or decrease of the tension which the adjusting spring 72 applies to the moving parts. In this connection it will be noted that a spring 77, held in compression between the rear side of supporting plate 40 and a collar 78 on shaft 76, tends to hold the enlarged head portion 79 of that shaft in frictional engagement with the recessed portion of the front side of plate 40, to maintain spring 72 under any adjusted tension, and that the forward end of head 79 extends through an opening in plate 10, and is slotted to receive a screw driver to facilitate zero adjustment from the face of the instrument.

It will be apparent that the resistance which orifice 27 offers to the flow of fluid in the liquid system will depend upon its own size and length, and upon the viscosity of the liquid employed in the system. Furthermore it will be apparent that any substantial change in the viscosity of the liquid will affect the pressures which are built up across the orifice under different operating conditions, and accordingly, the indication of rates of dive or rise. We prefer therefore to employ a liquid which has a comparatively flat viscosity-temperature characteristic, so that it will not become unduly thick or thin with changes in temperature. In this connection we have found that a silicone fluid having a viscosity of about 5 centistokes at 25° centigrade performs very satisfactorily in the illustrated unit. The solution of about 47.75% of tricresyl phosphate, about 42% of ethylene glycol monobenzylether, about 10% triethylene glycol, di-2 ethylbutyrate and about 0.25% by weight of rust inhibitor, described in our earlier Patent No. 2,412,740, is also suited to the requirements of an instrument of this kind. We do not intend to imply that our invention is limited to the use of either of these fluids, however, for others having appropriately flat viscosity temperature characteristics may exist or may be prepared; and in any event an absolutely flat viscosity may be attained by providing suitable heating equipment which will maintain the temperature of the liquid at a constant value.

It will be observed that the several essential parts of the instrument of Figs. 1 to 6 inclusive are so designed and arranged as to facilitate manufacture and assembly. Thus, the several parts of the displacement mechanism, i. e., bellows 17, cap 19, spring 20, and stop tube 21 may be independently formed and assembled upon cover plate 18, giving a sub-assembly adapted to be slipped into chamber 14 with a gasket 80 forming a leak-tight seal between the cover plate and a flange 81 on casing 12. The indicating mechanism may be built up upon supporting plate 40 as previously described, and that sub-assembly may then be set into the front of body 25 and secured in place by suitable screws (not shown) as is illustrated in Fig. 1. The graduated dial 10 may then be fitted into the flanged portion 82 of body 25 and fixed in place by screws or in any other suitable way, after which pointer 11 may be mounted on the end of pointer shaft 56, and the face of the instrument covered by dial glass 83 which is fixed in place between suitable gaskets 84 and a bezel 85, screws 86 serving to secure the latter to the body 25. These two major sub-assemblies may then be brought together, with conduit 23 in cover 18 aligned with conduit 24 in body 25, and the whole assembly secured together by screws 87 or in any other suitable way. The liquid system may be evacuated and filled with a selected liquid, and the sump affixed to the body in the manner heretofore described.

The unitary instrument which is shown in the drawings has much to commend it. Its several parts and sub-assemblies may be made and assembled by skilled workers in a factory or instrument shop; its liquid system may be carefully evacuated and filled—a job which is somewhat tedious and difficult but one which is essential to satisfactory final operation, and the whole unit subjected to test before shipment; and the completed device is ready for installation in a submarine vessel, an operation which requires no more than its mounting in the proper position and the connection of its sea water chamber to the outside of the vessel. If desired, however, casing 12, cover plate 18, and the several parts carried by the latter element may be assembled as a unit, separate and apart from the assembled indicating mechanism and the sump; and these two sub units may then be mounted on a submarine vessel in locations remote from one another and connected only by a conduit which represents no more than an extension of passages 23 and 24.

It will be observed that the instrument shown in the drawings has been designed and built to indicate diving or rising within a fairly wide range of from zero to eight feet per second, and at all depths up to 200 feet below the surface. Obviously, however, the operating range may be very much increased to include even crash diving rates, or it may be decreased to any desired extent, as for example, by a mere variation of the stiffness of spring 65 which opposes movement of the pressure sensitive bellows element 33. So, too, that part of the operating range which is indicated on an expanded scale may be increased or decreased by an adjustment of stop screws 70 and an appropriate remarking of scale 10. Again, the instrument may be built for operation at much greater depths, say at 400 or more feet below surface, in line with present trends in submarine work, by the use of an appropriately rugged displacement bellows 17, and an appropriately rated spring 20. It will also be apparent that the form and arrangement of spring 65, and its associated stop elements 70, which provide for expanded-contracted scale operation, may be varied from that which has been shown for illustrative purposes.

It will be observed that our instrument functions basically as an indicator of the rate at which the pressure applied to its displacement diaphragm 17 is changing. In the illustrated embodiment, the pressure in question is that of the open sea at various depths, a measure of the change of rate at which a submarine vessel is diving or rising. Those familiar with the art will readily recognize, however, that our instrument may be employed for measuring changing pressure under substantially any circumstances, as for example, the discharge of a pump, in the outlet of a standpipe or reservoir system, etc.

Having described our invention in its broader aspects, and illustrated it by way of specific example, what we claim as new and useful is:

1. A pressure gauge comprising a pressure sensitive member which is adapted to be displaced in proportion to pressure applied to its interior, means for connecting said member to a pressure system, a multiplying sector, a pivotally mounted bar attached to said pressure sensitive member and connecting the member and the sector, a pinion meshed with the sector, a shaft driven by the pinion, a pointer carried by the shaft, a second sector meshed with the pinion, a hair spring connected to said second sector and serving to hold both of the sectors meshed with the pinion, a leaf spring mounted in the fore end of said pivotally mounted bar, a pair of spaced stop elements disposed on opposite sides of said leaf spring, said stop elements serving to allow free movement of said bar and pressure sensitive elements within predetermined limits, and to cause said spring to oppose such movement beyond said limits, a second pair of stop elements mounted in opposing relation on opposite sides of said bar to limit movement of the bar and pressure sensitive member, a coil spring connected at one of its ends to said bar and means connected to the other end of said coil spring for varying the tension applied to said bar to adjust the zero position of said pressure sensitive member and of said pointer.

2. A pressure gauge comprising a pressure sensitive member which is adapted to be displaced in proportion to pressure applied to its interior, means for connecting said member to a pressure system, a multiplying sector, a pivotally mounted bar attached to said pressure sensitive member and connecting the member and the sector, a pinion meshed with the sector, a shaft driven by the pinion, a pointer carried by the shaft, a leaf spring mounted in the fore end of said pivotally mounted bar, a pair of spaced stop elements disposed on opposite sides of said leaf spring, said stop elements serving to allow free movement of said bar and pressure sensitive elements within predetermined limits, and to cause said spring to oppose such movement beyond said limits, a coil spring connected at one of its ends to said bar and means connected to the other end of said coil spring for varying the tension applied to said bar to adjust the zero position of said pressure sensitive member and of said pointer.

PERCY B. LEVITT.
JOHN G. MORGAN.

References Cited in the file of this patent
UNITED STATES PATENTS

| Number | Name | Date |
| --- | --- | --- |
| 1,187,738 | Janney | June 20, 1916 |
| 1,289,712 | Evans | Dec. 31, 1918 |
| 1,809,898 | Heise | June 16, 1931 |
| 1,869,934 | Doser | Aug. 2, 1932 |
| 2,054,911 | Newell et al. | Sept. 22, 1936 |
| 2,057,576 | Johnson | Oct. 13, 1936 |
| 2,176,807 | Wunsch | Oct. 17, 1939 |
| 2,284,588 | Rineer | May 26, 1942 |
| 2,412,740 | Morgan et al. | Dec. 17, 1946 |
| 2,431,098 | Wallace | Nov. 18, 1947 |

FOREIGN PATENTS

| Number | Country | Date |
| --- | --- | --- |
| 32 | Great Britain | 1904 |
| 455,647 | France | May 29, 1913 |